H. E. MANLEY.
REGISTER.
APPLICATION FILED APR. 25, 1919.
1,409,879.
Patented Mar. 14, 1922.
3 SHEETS—SHEET 3.
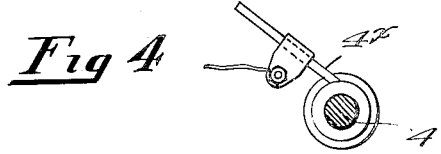
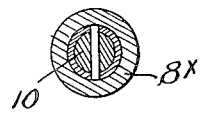
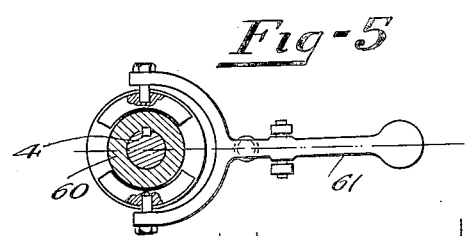
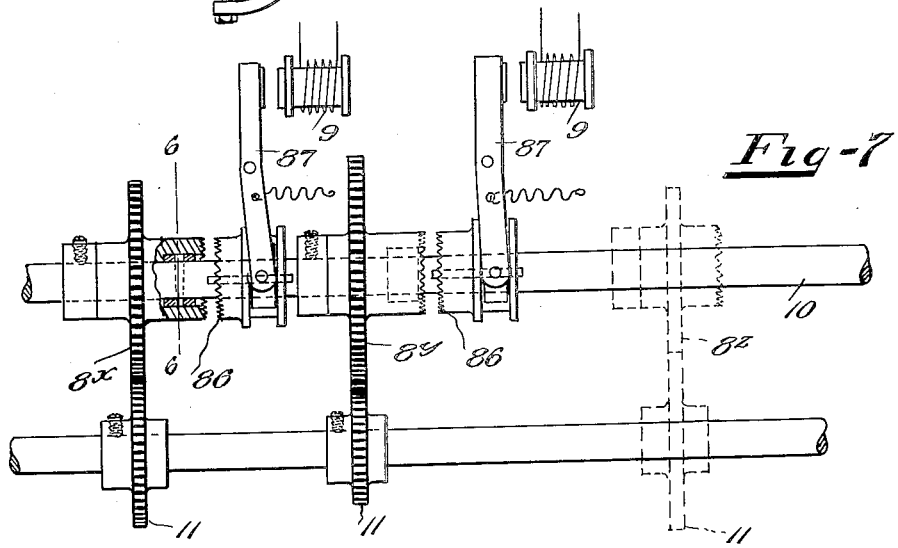
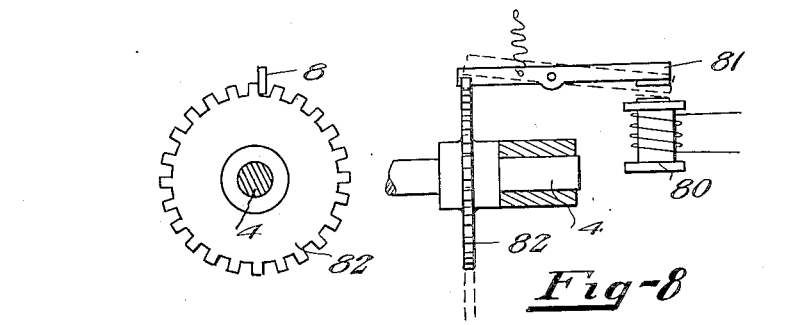
WITNESSES:
E. R. Rulphut
J. E. ——
INVENTOR
H. E. Manley
BY
Victor J. Evans ATTORNEY

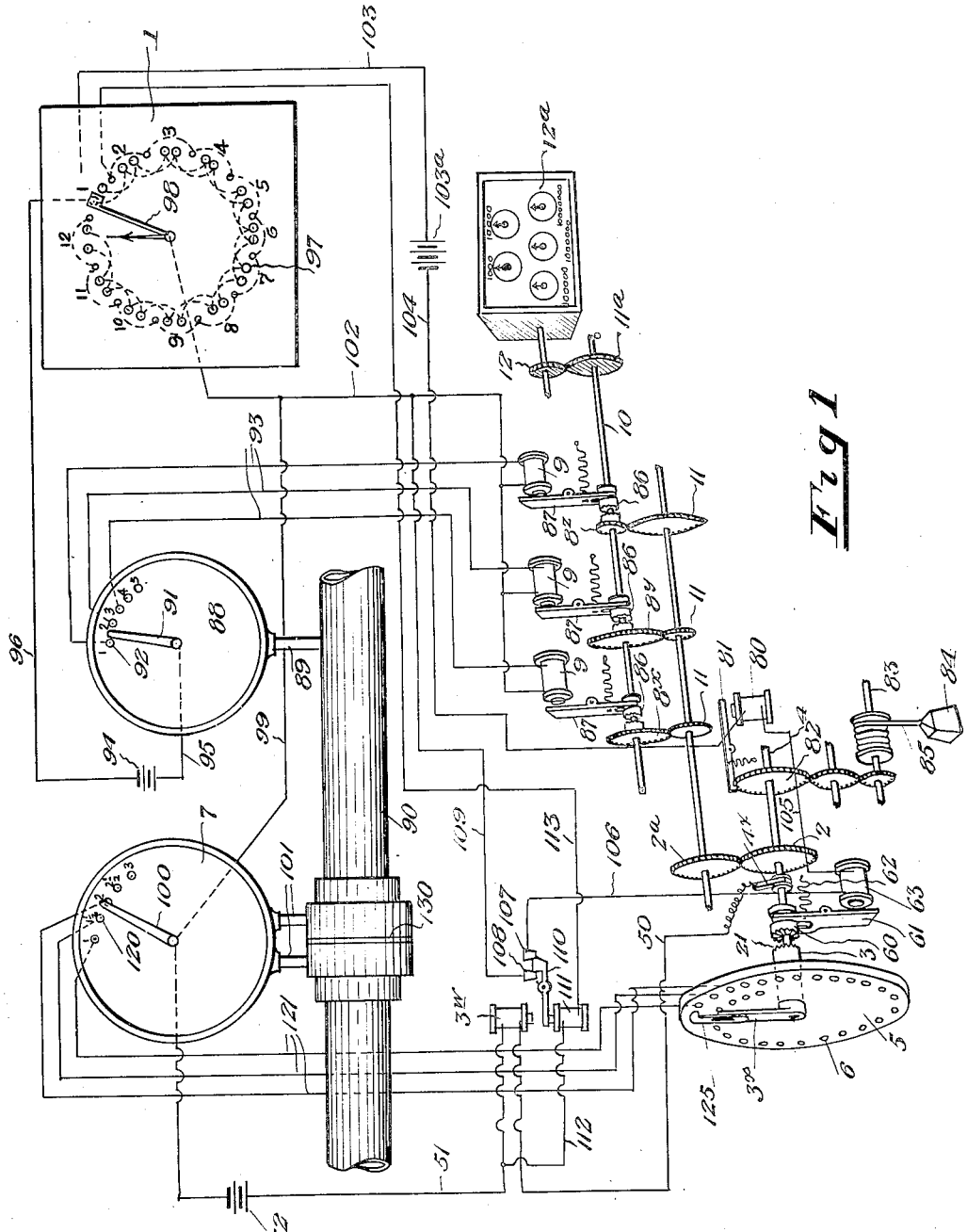

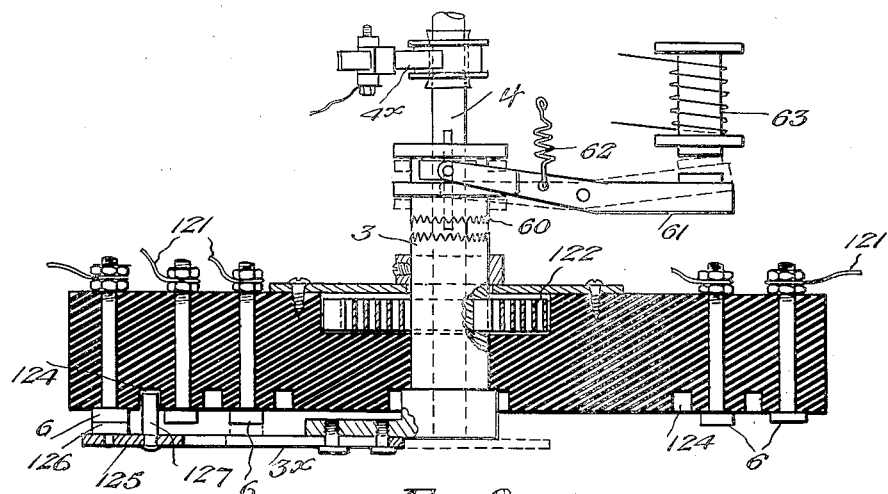
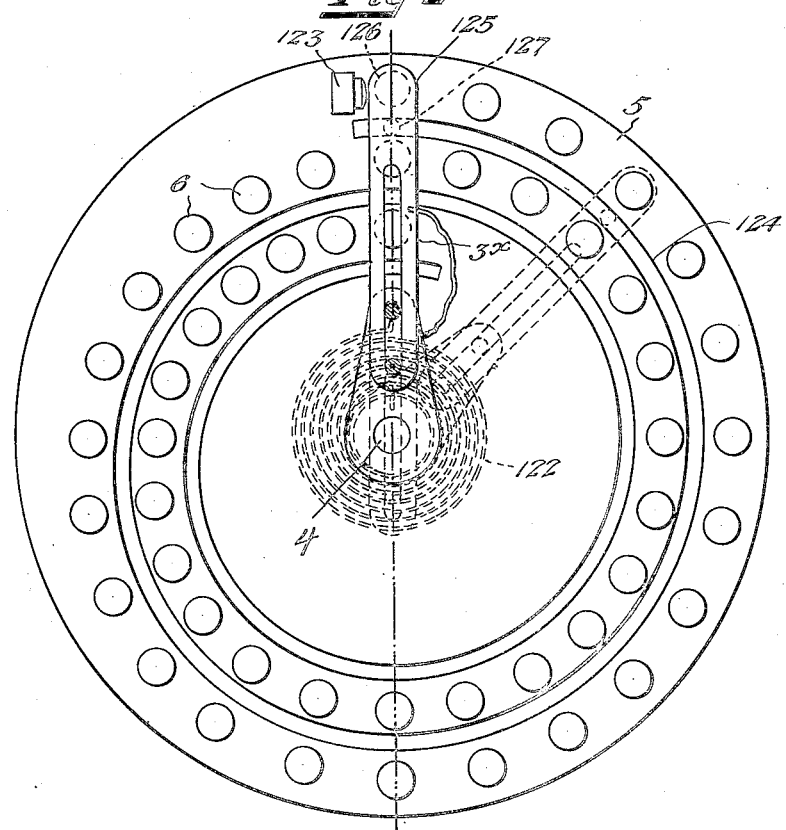

UNITED STATES PATENT OFFICE.

HENRY ERVIN MANLEY, OF OLEAN, NEW YORK, ASSIGNOR TO MANLEY AND BARLOW, OF CORRY, PENNSYLVANIA, A FIRM COMPOSED OF HENRY E. MANLEY AND GEORGE H. BARLOW.

REGISTER.

1,409,879.  Specification of Letters Patent.  Patented Mar. 14, 1922.

Application filed April 25, 1919. Serial No. 292,558.

*To all whom it may concern:*

Be it known that I, HENRY ERVIN MANLEY, a citizen of the United States, residing at Olean, in the county of Cattaraugus and State of New York, have invented new and useful Improvements in Registers, of which the following is a specification.

My present invention pertains to registers and more particularly to registering means for use in conjunction with orifice meters.

Natural gas is, at present, measured by orifice meters or Pitot tubes, and the pressures, static and differential, are recorded on circular charts which are computed through the medium of a planimeter and are averaged for any predetermined period, 24 hours for example.

Stated generally the object of my register is to convert the root and computations to a registering dial that is adapted to be read in the same manner as a conventional gas meter dial, and in that way obviate the necessity of resorting to computations. This will be understood when it is stated that the orifice meter is a simplification of the Pitot tube and is used for measuring gases on the principle that when an orifice is inserted in a pipe or tube it reduces the pressure on the outlet side of the orifice in proportion to the volume of gas flowing away from said orifice. The dynamic pressure back of the orifice determines the volume passing or in other words, pressure multiplied by speed equals volume. See formula in Westcott's Hand Book of Natural Gas. Quantity per hour passing through a tube or orifice whose hourly coefficient is C.

Q equals—

$$C\sqrt{h(P+14.4)}$$

where $h$ is the difference in inches of water level in the U gauge.

P equals gauge pressure.

14.4 avg. yearly atmospheric pressure in pounds per sq. inch. for conditions where natural gas is usually sold.

From expression $$\sqrt{h(P \text{ plus } 14.4)}$$

it will readily be seen that a table can be compiled which makes the work of arriving at the quantity Q a very simple matter.

At present charts are used, made principally by The Foxboro Instrument Company and the Bristol Gauge Company which record the differential in inches of water on a clock dial chart for 24 hours. At the same time another clock dial chart makes a record of the static pressure (pressure on the outlet side of the orifice.) We then have a book of tables in tenths of inches of water with a page for each pound pressure which gives the extension which consists of the resultant of the above equation.

For instance suppose you find that for any 15 minute period on the chart the pen recorded 25 inches of water and 17 pounds gauge static pressure. Then looking at page 17 opposite 25 inches the extension would be 28.018 or if 25 pounds and 17 inches then the extension would be 25.880. It will be readily seen that if taken in 15 minute periods, it involves 96 triple or quadruple transactions to compute a single day's charts.

It will also be seen that the total of all the extensions when multiplied by the coefficient of the orifice will equal the amount of gas passed in the 24 hour period.

The coefficient of the orifice is the number arrived at by test and computation, from the diameter of the orifice, the temperature of and gravity of the flowing gas &c., and is considered constant.

In other words the coefficient of the orifice is the constant of the equation and the extension is the variable.

My invention is simply an extension recorder or register which will give the total extensions on a dial, which might be the same or different for any sized orifice.

In putting my invention into practice the rule for measurement adopted will be that the square root of the static pressure in pounds plus 14.4 multiplied by the square root of the differential or flow pressure in inches of water multiplied by the coefficient of the orifice equals the number of feet passing in a given time. My invention in its practical application is designed to convert the readings referred to into mechanical movements which are displayed on a dial.

The invention in all of its details will be fully understood from the following description and claims when the same are read in connection with the drawings, accompanying and forming part of this specification, in which:

Figure 1 is a general view diagrammatic in character, showing one embodiment of my invention.

Figures 2 and 3 are enlarged details of the spring-actuated contact bearing disk of the apparatus.

Figure 4 is a detail view illustrative of the brush and the shaft with which said brush is electrically connected.

Figure 5 is a detail section showing the clutch member 60 and its appurtenances.

Figure 6 is a detail cross-section on line 6—6 of Figure 7 through the hub of the wheel $8^x$ and the shaft on which the same is arranged.

Figure 7 is an enlarged elevation showing certain of the electrically controlled connections, and the mechanism associated therewith.

Figure 8 comprises disconnected views of the stop-motion means.

Similar numerals designate corresponding parts in all of the views of the drawings.

In the carrying out of my invention I contemplate the employment of a time clock and electrical circuits, the arrangement and the provisions being such that when the minute hand of the time clock approaches the end of a period, say a five minute period, the contact of the said hand is placed in electrical connection first to a wire leading through a static pressure gauge or pounds pressure gauge, standing at say seventeen pounds and designed to act on the electro-magnet of an absolute pressure wheel and fix said wheel to its shaft. The invention also contemplates calibrating the absolute pressure wheel so as to multiply the distance of the action of another wheel by 5.6 or the square root of seventeen plus 14.4 equals 5.6. An electro-magnet is designed to hold the wheel fast on the shaft until a completion of the operation of the mechanism. Then after the lapse of a few seconds a clock hand contact connecting with a Pitot box comes into action and completes the circuit which starts certain wheels and at the same time brings about the circuit through a wire communicating with a contact point on a certain proper contact element.

The invention further contemplates certain operations, hereinafter explicitly referred to, whereby certain registrations will be brought about as hereinafter specifically set forth.

As before indicated my invention involves the use of a time clock 1 with five minute or longer or shorter periods for the action of the mechanism to make electrical contacts and bring about the passage of current through the wires hereinafter set forth.

Referring particularly to Figure 1:

2 is what I denominate the first registration wheel which is designed to be propelled by means hereinafter described, and is calibrated to millimeter or other decimal teeth which are intermeshed with a registration wheel $2^a$ of the same diameter as the wheel 2, and the same number and size of spur gear teeth. At 3 is a rotary element. The wheel 2 revolves with a shaft 4 which is disconnected from the element 3, but is adapted to interlock with i. e., be clutched to the same. At 5 is a fixed disk formed of a suitable non-conducting material through which wires communicate as hereinafter set forth. The disk 5 is equipped with contacts 6 and these are set at such points that when the arm $3^x$ on element 3 revolves to the live contact 6 or the particular contact 6 through which the electrical current is flowing, a circuit is completed through an electrical magnet $3^w$, hereinafter described, and the mechanism is stopped. The magnet $3^w$ is electrically connected through conduit 51 with one pole of a source of electrical energy 52, and through a conduit 50, brush $4^x$, shaft 4, element 3, arm $3^x$ and contact 126 with one end of the live contact 6 mentioned. The opposite end of said contact 6 is electrically connected so that the path of the current that passes through said contact 6 will be as hereinafter explicitly set forth in the step by step description of the operation; it being deemed sufficient to state here that the incomplete circuit is completed by the arrival of the arm $3^x$ at the live contact 6 which makes a short circuit through the shaft 4, conductor 50, magnet $3^w$, and conductor 51 to battery 52 cutting out the whole mechanism. The contacts 6 are preferably arranged in a spiral series and are designed to represent the decimal of the square root of the indicated differential. This will be better understood when it is stated that after the flow gage 7 connected to the Pitot box indicates nine inches of water, the contact will be so adjusted that the rotary element 3 will work through 3,000 mm of space before closing the circuit; three being the square root of nine and 1,000 teeth for three decimals, which root is communicated to the wheel $2^a$ and causes it to register the same amount after the making of a contact by the pressure guage 88, to complete the circuit corresponding to the proper absolute pressure wheel $8^x$. The example 3000 mm. will be understood when it is stated that according to the example given herein the circumference of the gear 2 would have revolved together with the arm $3^x$ through 3000 mm. of space—i. e., three times around, thus measuring off the distance in mechanical movement equal to the square root of the differential in said example. There will be as many absolute pressure wheels employed as is necessary to indicate the number of pounds pressure involved, three wheels $8^x$ $8^y$ and $8^z$ being shown in Figure 1. The circuits just referred to operating through electro-magnets 9 have the effect of clutching the positive pressure wheels separately to the shaft 10. These absolute pressure wheels will be so calibrated that in conjunction with intermeshed wheels 11 on the shaft of the wheel $2^a$ they will multiply the resultant on the particular wheel fixed to shaft 10 during operation by the square root of the indicated pressure plus 14.4, communicating the extension to the wheel $11^a$ on shaft 10 in millimeter or teeth space. It is to be understood that the wheels $8^x$ $8^y$ and $8^z$ are normally loose on shaft 10. The wheel $11^a$ is the resultant wheel, and meshes with a coefficient wheel 12 which may be utilized as an inter-changeable wheel designed to permit of the employment of a plurality of wheels removable and constructed to multiply by the five minute or other period coefficient of the orifice and to register the space through which it moves on a dial $12^a$ similar to that of an ordinary meter. Manifestly when each contact is broken the wheels $8^x$ $8^y$ or $8^z$ involved will be rendered loose on shaft 10. $11^a$ is the resultant wheel in the sense that it carries the mechanical movement equivalent to the desired extension referred to, and 12 is a coefficient wheel in the sense that it multiplies the movement of the wheel $11^a$ by the constant coefficient of the particular orifice involved. The five minute coeffifficient is the constant or multiple which reduces the extension or mathematical computation to actual feet.

In Figures 1, 2 and 3, it will be observed that there are a plurality of contacts 6; also that said contacts in the illustrated embodiment are in the form of buttons disposed in a spiral series. I do not desire, however, to be understood as confining myself to contacts in the form shown, or any other specific contacts. The said contacts 6 are characterized by the capacity to convey the current from the differential or flow gauge, hereinafter described, so as to adjust the mechanism to the root of the differential pressures in teeth distance on the calibrated wheel 2. The rotary element 3 is preferably in the form of a hollow shaft revolving on the shaft 4, and provided with a clutch member 21 at its inner end, Figure 1. The arm $3^x$ has for its function to determine the distance the wheel 2 shall move as it is electrically connected with the shaft 4 as is also a brush $4^x$, Figure 4, which brush is connected with a wire 50 to the magnet $3^w$, which is connected by wire 51 with one pole of the battery 52, so that when the arm $3^x$ arrives opposite the live contact 6, it completes the circuit as before described which causes the electro-magnet $3^w$ to stop the operation of the registering mechanism. Any suitable means for bringing about the consecutive rotation of the arm $3^x$ may be employed without involving departure from the scope of my claimed invention. I prefer, however, to employ the electro-mechanical means shown as comprising a clutch member 60, splined on shaft 4, an armature lever 61 connected with said member 60 and subject to the action of a spring 62, an electro-magnet 63 complementary to the armature lever 61, and an electro-magnet 80 opposed to one arm of a spring actuated armature-lever 81. The other arm of said lever is presented to an auxiliary spur gear 82 on the shaft 4, so as to serve as a stop-motion device, and said gear is connected as shown in Figure 1, with a shaft 83 that is turned by the gravitation of a weight 84 on a cable 85, or by clock work or other power, so as to rotate the arm $3^x$ step by step.

Clutch members 86 are splined on the shaft 10 in opposition to complementary clutch members carried by the gears $8^x$ $8^y$ and $8^z$, and said clutch members 86 are connected to the spring-controlled armatures 87 of the magnets 9.

At 88 is a pressure gauge indicating in pounds connected through a conduit 89 with the fluid conduit 90; the said gage has a swinging hand 91 and contacts 92, the latter in individual electrical connection with the electro-magnets 9 through wires 93. At 94 is a source of electric energy one pole of which is connected through a wire 95 with the hand 91, and the other pole of which is connected through wire 96 with the group of contacts 97 provided as part of the clock equipment. The contact making hand 98 of the clock is connected through a wire 99 with the hand 100 of the flow gage 7; said wire 99 being also connected through wire 102 with the electro-magnets 9. The clock contacts 97 are connected through wire 103 with one pole of a battery $103^a$, the other pole of which is connected through wire 104 with the magnet 80. This magnet is connected through wire 105 with the magnet 63, and from said magnet 63 a wire 106 extends to a terminal 107, spaced from a terminal 108 that is connected through wire 109 with the main wire 102. A circuit making and breaking armature 110 complementary to terminals 107 and 108 is opposed to a magnet 111, and said magnet 111 is connected through wire 112 with the wire 51, and through wire 113 with the contacts 97 of clock 1. The flow gage 7 is provided with contacts 120 for cooperation with the hand 100, and the said contacts are individually connected through wires 121 with the contacts 6 of the disk 5.

At 122, Figures 2 and 3, is a coiled spring for returning the arm $3^x$ to its initial position when the clutch member 60 is separated from the member 21, and at 123 is a stop for said arm. The disk 5 is spirally grooved at 124, and on the arm $3^x$ is an endwise slidable member 125, equipped with a contact 126 to engage the contacts 6, and also equipped with a stud 127 which traverses the groove 124 so as to present the contact 126 in succession to each of the contacts 6, of the spiral series.

The flow gage 7 is connected through conduits 101 to the conduit 90 at opposite sides of the orifice plate 130, so as to enable said gage to determine how far the hand 100 shall move.

In operation, the wheel $2^a$ which intermeshes with the wheel 2 as before described, simply carries the square root of differential pressure.

The wheel of the series $8^x$, $8^y$, $8^z$, is selected by the pressure gauge to multiply the square root of the differential at 2 by the square root of the absolute pressure on the extension wheel, these wheels being each calibrated to accomplish the said multiplication.

It will be gathered from the foregoing that my novel mechanism is designed and adapted to provide for the registration of the readings of orifice meters or Pitot tubes without the necessity of resorting to computation; also that the operation of the mechanism is as follows:

As the contact hand 98 of the time clock approaches the completion of the five minute period, the circuit contact element is put in action first through the wire leading through the static pressure gauge 88 which may be assumed to stand at 17 pounds, acting on the electro-magnet corresponding to the absolute pressure wheel $8^x$ to fix the same to shaft 10. This absolute pressure wheel $8^x$ is calibrated to multiply the distance of action of the wheel 2 by five and six-tenths or the square root of 17 plus 14.4 which equals five and six-tenths. The wheel or gear $8^x$ is held fast to the shaft 10 until the action of the mechanism is completed. A few seconds later the clock contact of gage 7 connected with the Pitot box comes into action and completes the circuit which starts the wheels, at the same time sending a current through the wire communicating with the contact point 6 on the disk 5.

The Pitot box is of ordinary construction and is not of my invention. I have therefore deemed it unnecessary to illustrate said box.

The operation of my novel organized mechanism and the advantages following therefrom will be better understood from the following step by step description.

At the conclusion of each five minute period the contact hand of the clock 1 establishes the following circuits, when each brings about the mechanical actions hereinafter set forth:

First: The clock circuit contact hand 98 in clock 1 closes the circuit through the wire 96, battery 94, wire 95, pressure gauge hand 91, contact point 92, wires 93 to the indicated selected electro-magnet 9, which latter acts on the proper clutch 86 thereby "selecting" the proper multiplier wheel $8^x$, $8^y$, etc., which multiplies the action of the flow wheel $2^a$ by the square root of the pressure plus 14.4 indicated by the gauge 88. The current energizing the electro-magnet 9 returns via wire 102 to clock contact-hand 98. This contact continues during the full operation of the machine until all contacts are broken by operation of electro-magnet $3^w$ Second: Shortly thereafter a clock contact is connected bringing into operation the passage of current on line 103 through battery $103^a$, line 104 and electro-magnet 80 bringing into operation the release 81 starting the machine by power means 83. This same current traveling through the line 105 also brings magnet 63 into operation on armature 61, thus clutching the members 60 and 21, causing arm $3^x$ to revolve. The arm $3^x$ bearing the contact point 126, Figure 2, begins to revolve and continues to do so until it comes in contact with the "live" contact 6 indicated by the current in operation through the flow gauge 7. This current which sets magnet 63, flows along line 106 through contact points 107 and 108, lines 109 and 102 to hand 98, thus completing this circuit.

Third: The same clock contact that starts the mechanism also contributes to a "broken" circuit through the line 99 with the hand 100 of flow gauge 7, which always indicates the flow in inches of water and is in contact with some one of the contact points 120. Flowing through this contact through wire 121, it communicates with its proper contact point on the spiral of the fixed disk 5. As soon as the arm $3^x$ arrives at this "live" contact it completes the circuit through the shaft 4 and line 50 through the magnet $3^w$, thus completing a "short circuit," which through the magnet $3^w$ breaks the connection at 107 and 108, thus de-energizing all magnets and circuits in operation and stopping the mechanism, all elements returning to their idle condition.

Fourth: After the action of the contact hand which passes the group of contacts at each five-minute period and then comes to a final contact which resets the contact points 107 and 108, and before the next periodical action of the mechanism, an additional contact operates through the wire 113 and the magnet 111 to set the lever connecting the terminals 107 and 108. The current then returns through wires 112 and 51, battery 52, gauge 7 and lines 99 and 102, to contact hand 98, which action sets the mechanism for the next five minute period. These several operations are repeated at stated intervals, and constitute the general operation of the mechanism converting the gauge readings into mechanical movements registered on a dial, giving the resultant computations of the varying conditions existing during a flow of any gas or liquid through an orifice or Pitot tube or conduit.

Having described my invention, what I claim and desire to secure by Letters-Patents is:

1. In means for the purpose described, the combination of a conduit, an orifice meter, a clock having contacts representing periods of time and also having a movable contact member for cooperation with said contacts, registering means, and electro-machanical means controlled by the clock and the orifice meter for determining the extent of movement of the registering means.

2. In means for the purpose described, the combination with a conduit and an orifice meter, of a clock having contacts representing periods of time and a contact hand for cooperation with said contacts, mechanical registering means, a pressure gage connected with said conduit and having contacts and a contact hand to cooperate therewith, a flow gage connected with the conduit at opposite sides of the orifice and having contacts and a contact hand to cooperate therewith, electro-mechanical means controlled by the clock and pressure gage for selecting means for the operation of the registering means, power means for actuating the mechanism, and electro-mechanical means controlled by the clock, the pressure gage and the flow gage for determining the extent of movement of the registering means and integrating such means.

In testimony whereof I affix my signature.

HENRY ERVIN MANLEY.